United States Patent [19]

Shimomura et al.

[11] 3,898,302
[45] Aug. 5, 1975

[54] PROCESS FOR PRODUCING BLOCK COPOLYMER

[75] Inventors: Takatoshi Shimomura, Toyonaka; Hideo Nagata; Yoshiaki Murakami, both of Ibaragi, all of Japan

[73] Assignee: Sumitomo Chemical Co., Ltd., Osaka, Japan

[22] Filed: May 18, 1972

[21] Appl. No.: 254,437

[30] Foreign Application Priority Data
May 21, 1971   Japan................................ 46-34895

[52] U.S. Cl. ............................ 260/880 B; 260/84.7
[51] Int. Cl. ............................................. C08f 19/08
[58] Field of Search ....................... 260/84.7, 880 B

[56] References Cited
UNITED STATES PATENTS

| | | | |
|---|---|---|---|
| 3,251,905 | 5/1966 | Zelinski | 260/880 |
| 3,287,333 | 11/1966 | Zelinski | 260/880 |
| 3,366,611 | 1/1968 | Wofford | 260/84.7 |
| 3,451,988 | 6/1969 | Langer | 260/84.7 |
| 3,678,121 | 7/1972 | McElroy | 260/94.2 M |
| 3,679,650 | 7/1972 | Schott | 260/93.5 |
| 3,687,924 | 8/1972 | Schott | 260/93.5 |

FOREIGN PATENTS OR APPLICATIONS

| | | | |
|---|---|---|---|
| 254,773 | 10/1970 | U.S.S.R. | 260/880 |

*Primary Examiner*—Joseph L. Schofer
*Assistant Examiner*—P. R. Michl
*Attorney, Agent, or Firm*—Stevens, Davis, Miller & Mosher

[57] ABSTRACT

A self-curing block copolymer, which has improved elastomeric properties without being subjected to any special chemical or physical treatment, is obtained by a single-stage process which comprises subjecting coexistent conjugated diene and vinyl-substituted aromatic hydrocarbon to the action of a dilithium catalyst, and, after substantial completion of polymerization of the conjugated diene, adding a chelating bi- or tri-functiona Lewis base to continue polymerization of the vinyl substituted aromatic hydrocarbon. The block copolymer thus obtained has a high tensile strength and high elongation in the unvulcanized state and can be processed similarly to a thermoplastic resin by injection and extrusion techniques.

11 Claims, No Drawings

PROCESS FOR PRODUCING BLOCK COPOLYMER

This invention relates to a novel process for producing a three-block copolymer having the so-called self-curing property, which exhibits useful elastomeric properties without requiring any special chemical or physical treatment.

More particularly, this invention relates to a process for producing a block copolymer containing in the molecule thereof a middle copolymer block composed of predominant units of a conjugated diene and remaining units of a vinyl-substituted aromatic hydrocarbon represented by the general formula,

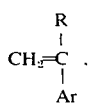

(wherein Ar is an aryl group and R is hydrogen or an alkyl group of 1 to 10 carbon atoms), and homopolymer end-blocks composed of units of said vinyl-substituted aromatic hydrocarbon, by the action of a dilithium compound on coexistent conjugated diene and said vinyl-substituted aromatic hydrocarbon to effect anionic polymerization, which comprises carrying out said anionic polymerization in the presence of a chelating bi- or tri-functional Lewis base added thereto.

While various block copolymers have heretofore been prepared from a variety of monomers using an organoalkali metal compound as an initiator, it has been known that in producing a block copolymer with a self-curing property, the polymer molecule must be constructed in such an arrangement that a conjugated diene block is in the middle and blocks of a specific non-elastomeric unsaturated compound at both ends. It has also been known that when alkali metals other than lithium are used as catalyst or when compounds other than hydrocarbons are used as solvent, the content of cis-1,4 linkages in the diene block becomes considerably low so that a block copolymer of useful elastomeric properties can hardly be obtained.

Consequently, there has been adopted a process in which, by use of an organic monolithium compound as an initiator and a technique of living polymerization, a stepwise polymerization is carried out in such a manner that successively a non-elastomeric block consisting of vinyl-substituted aromatic hydrocarbon units, an elastomeric block consisting mainly of conjugated diene units, and again the same non-elastomeric block as the first named are formed. Alternatively, there has been adopted a process in which polymerizations of a vinyl-substituted aromatic hydrocarbon and of a conjugated diene are carried out stepwise in uninterrupted succession to prepare a living polymer, [non-elastomeric block-elastomeric block]$^-$Li$^+$, and then two or more of the living polymers are linked with each another by use of a suitable linking agent, resulting in an abrupt increase in molecular weight and simultaneous formation of a three-block copolymer. However, in the case where an organic monolithium compound is used as an initiator, as in conventional processes, to form a living polymer active at one end and then each segment is linked together stepwise, there occurs increased inactivation of the active end due to impurities contained in the solvent, successively added monomers and linking agent, resulting in increased formation of homopolymers and a two-block copolymer, which considerably deteriorate physical properties of the product block copolymer as a self-curing elastomer. Moreover, conventional processes have failed in polymerizing α-substituted styrenes, which have low ceiling temperatures, and hence in synthesizing a block copolymer having blocks of an α-substituted styrene at both ends, which is expected to be an elastomer of the self-curing type superior in physical properties to an ordinary block copolymer.

As a result of detailed investigation on the mechanism of initiation and chain growth in the polymerization of a conjugated vinyl monomer capable of forming a stable carbanion, the present inventors found that a complex formed from an organolithium compound and a certain chelating bi- or tri-functional Lewis base greatly increases the rate of both initiation and chain growth in anionic polymerization of a conjugated vinyl compound. Based on this finding, the present inventors have developed a process for producing a block copolymer having in each molecule a middle copolymer block composed of predominant units of a conjugated diene and remaining units of a vinyl-substituted aromatic hydrocarbon and homopolymer end blocks composed of vinyl-substituted aromatic hydrocarbon units, which comprises adding a chelating bi- or tri-functional Lewis base in anionic polymerization of coexisting conjugated diene and vinyl-substituted aromatic hydrocarbon by use of a dilithium catalyst which bilaterally initiates polymerization.

An object of this invention is to provide a process for producing a block copolymer of the self-curing type having improved elastomeric properties without requiring any special chemical and physical treatments.

Another object of this invention is to provide a block copolymer which has a high tensile strength and a high elongation in unvulcanized state and is capable of being processed by injection molding and extrusion in the same way as a thermoplastic resin.

In the process for living polymerization according to this invention, in order to secure rubber-like microstructure of the middle block composed mainly of conjugated diene units in the block copolymer molecule, a chelating bi- or tri-functional Lewis base is added preferably after substantial completion of the polymerization of a conjugated diene.

In the process of this invention, after addition of a chelating bi- or tri-functional Lewis base, the lithium cations existing as counter-ions at both active ends of a polymerizing molecule are always captured by the chelating bi- or tri-functional Lewis base. Accordingly, the active species takes part in the polymerization reaction in the form of a substantially free carbanion and hence most of the vinyl-substituted aromatic hydrocarbons rapidly polymerize in a hydrocarbon even at an extremely low temperature. For instance, a relatively high temperature and a long period of time are required for polymerization of styrene in a hydrocarbon with an organo lithium catalyst, whereas in the process of this invention the polymerization is completed within several minutes at a low temperature below 0°C. Conventional processes failed in synthesizing a block copolymer having at both ends blocks of a styrene derivative containing a methyl group in the α-position, because owing to a lower ceiling temperature as well as an electron-donating tendency due to the α-methyl group, said styrene derivative will not yield a polymer with an organolithium catalyst in a hydrocarbon at a temperature within an ordinary range of −78° to 100°C.; whereas according to this invention, in the presence of a chelating bi- or tri-functional Lewis base, polymerization of said styrene derivative proceeds at a sufficiently high rate even at a temperature as low as −78°C. and the synthesis of a block copolymer having both end blocks of a styrene derivative containing a methyl group at the α-position has been successfully carried out for the first time. Further, it is a desirable fact that compared with self-curing elastomers prepared by conventional processes thermal properties of the block copolymer according to this invention are considerably improved when both end blocks are composed of units of a styrene derivative having a methyl group at the α-position.

In the following, the invention will be more concretely disclosed.

The lithium compounds for use in the process of this invention as catalysts are organolithium compounds having two lithium atoms in the same molecule, which are represented by the general formula, $R(Li)_2$, and include alkylenedilithium compounds such as methylenedilithium, ethylenedilithium, trimethylenedilithium, tetramethylenedilithium, pentamethylenedilithium, and hexamethylenedilithium; aryldithium compounds such as 1,4-dilithiobenzene, 1,5-dilithionaphthalene, 1,2-dilithio-1,2-diphenylethane, 1,2-dilithio-1,3-diphenylpropane, and 1,4-dilithio-1,1,4,4-tetraphenylbutane; addition compounds of metallic lithium with olefins such as isoprene, styrene and α-methylstyrene; and addition compounds of metallic lithium with polycyclic aromatic hydrocarbons such as naphthalene, anthracene and phenanthrene, etc.

It is desirable that all these dilithium catalysts should be transformed by suitable tecnhiques to hydrocarbon-soluble materials prior to the initiation of polymerization.

The vinyl-substituted aromatic hydrocarbons to be used advantageously in the process of this invention are styrene, 3-vinyltoluene, α-methylstyrene, α,p-dimethylstyrene, 2,5-dimethyl-α-methylstyrene, 1-vinylnaphthalene, and the like, and include others without exceptions so far as they are polymerizable by use of an organolithium compound and have reactivity ratios different from those of conjugated dienes so that they may be susceptible to block polymerization. It is to be particularly noted that the process of this invention is also applicable to the compound having a substituent at the alpha carbon atom, such as α-methylstyrene. The conjugated dienes for use in producing the block copolymer according to this invention are 1,3-butadiene, isoprene, 1,3-pentadiene, and the like. The process of this invention is characterized by subjecting the coexisting both monomers to the action of the abovementioned dilithium compounds.

In the process of this invention, the chelating bifunctional Lewis base to be added after completion of the polymerization of a conjugated diene is an organic tertiary amine represented by the formula (I):

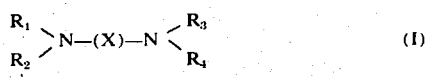   (I)

and the chelating tri-functional Lewis base to be similarly addded is an aminophosphine oxide represented by the formula (II):

   (II)

In the formula (I), the substituent groups $R_1$, $R_2$, $R_3$ and $R_4$ are alkyl groups of 1 to 4 carbon atoms and X is an alkylene group of 1 to 4 carbon atoms or a cycloalkylene group of 4 to 7 carbon atoms, both of which having as substituents 0 to 4 monovalent hydrocarbon groups of 1 to 20 carbon atoms. Of these groups represented by X, an alkylene group of 2 or 3 carbon atoms and a cycloalkylene group of 5 or 6 carbon atoms are far more desirable than other groups. Examples of suitable tertiary amine compounds are N,N,N′,N′-tetramethylmethanediamine, N,N-dimethyl-N′,N′-diethyl-1,2-ethanediamine, N,N,N′,N′-tetramethyl-1,2-ethanediamine, N,N,N′,N′-tetramethyl-2,3-butanediamine, N,N,N′,N′-tetramethyl-1,2-propanediamine, and N,N,N′,N′-tetramethyl-1,2-cyclohexanediamine. Of these, the most preferred is N,N,N′,N′-tetramethyl-1,2-ethanediamine.

In the formula (II), the substituent groups $R_1$ and $R_2$ are alkyl groups of 1 to 4 carbon atoms. Examples of such compounds include tris(dimethylamino)phosphine oxide, tris(diethylamino)phosphine oxide, and the like, of which tris(dimethylamino)phosphine oxide is particularly preferred.

The complex-forming reaction of such a chelating Lewis base with a polymer at the chain end where a lithium cation is attached as a counter-ion takes place momentarily, resulting in a free carbanion which enters the polymerization reaction as an active species. Therefore, may vinyl-substituted aromatic hydrocarbons rapidly polymerize in a hydrocarbon even at extremely low temperature. In the past, it had been observed that various ethers or amines accelerate polymerization of vinyl compounds catalyzed by an organolithium compound. These were used, however, in large excess against active end groups in the polymerization of vinyl compounds because there was no chelate formation, whereas in the process of this invention, it is sufficient to use the chelating bi- or tri-functional Lewis base in a ratio as small as 1 : 1 against the active end groups though the use of an excess amount of the chelating Lewis base will cause no trouble at all.

The polymerization can be effected either in bulk by adding a dilithium compound into a mixture of the above-mentioned monomers, or in solution by adding a dilithium compound into a solution containing a mixture of monomers dissolved therein. After the polymerization of a diene has been substantially complete, the chelating Lewis base is added to the polymerization system in an equimolar ratio against the active end groups. Alternatively, the chelating Lewis base can be added during the course of polymerization of the diene without causing any trouble except for deterioration of rubber-like characteristics of the microstructure. As far the solvent for use in the present polymerization reaction, inertness of the solvent to the living polymer is absolutely necessary. Suitable solvents are, for example, aromatic hydrocarbons such as benzene and toluene, and aliphatic hydrocarbons such as n-hexane, n-heptane, and cyclohexane, which are used each alone or in mixtures of two or more of them. These solvents and the starting materials are required to be freed from impurities, which could react with carbanions, prior to use in the polymerization, although the presence of some quantities of the impurities is not fatal to the polymerization except for some consumption of the polymerization initiators.

The polymerization temperature is generally −20° to 100°C., preferably 0° to 65°C., for the former part while copolymerization of a conjugated diene with a vinyl-substituted aromatic hydrocarbon is in progress, and thereafter can be freely selected from the range from −78°C. up to the boiling point of the solvent for the latter part, subsequent to the addition of a chelating Lewis base, while block-copolymerization of a vinyl-substituted aromatic hydrocarbon with the copolymer formed in the former part is in progress. The chain length and molecular weight distribution of the block copolymer thus formed are easily regulated so as to meet requirements for the end product by suitably selecting polymerization conditions such as the ratio of monomers to dilithium compound or the polymerization temperature. While there is no particular quantitative limitation between the conjugated diene, which forms the middle block, and the vinyl-substituted aromatic hydrocarbon, which forms both end blocks, it is desirable to use a block copolymer containing predominantly the former monomer as a self-curing elastomer and a block copolymer containing predominantly the latter monomer as an impact resistant plastic. The block copolymer produced according to this invention contains preferably 5 to 50% by weight of a vinyl-substituted aromatic hydrocarbon component (plastic component).

As mentioned in the foregoing, this invention provides a single-stage process for producing a self-curing block copolymer having an improved elastomeric characteristics without requiring any special chemical or physical treatment, which comprises subjecting the coexistent conjugated diene and vinyl-substituted aromatic hydrocarbon to the action of a dilithium catalyst and, after substantial completion of the conjugated diene, adding a chelating bi- or tri-functional Lewis base to further continue the polymerization. Particularly, this invention provides a process which is well suited for block copolymerization of an α-substituted styrene derivative such as α-methylstyrene. The block copolymer obtained according to this invention has a high tensile strength and a high elongation in the unvulcanized state and has an injection moldability and an extrusion moldability comparable to those of a thermoplastic resin.

The invention is illustrated below in detail with reference to Examples, but is not limited thereto. Measurement of the physical properties was carried out in accordance with JIS K 6301.

EXAMPLE 1

To 500 ml of toluene purified in an ordinary way, were added 7.3 ml of α, p-dimethylstyrene and 30 ml of isoprene, which had been dehydrated and purified with calcium hydride. After addition of 0.25 millimole (0.5 millimole as active lithium) of 1,2-dilithio-1,2-diphenylethane under a nitrogen stream to the said mixture, polymerization was initiated at 50°C. The viscosity of the reaction system increased with the lapse of time and the color of the solution turned from yellow to red after 6 hours from initiation, when the polymerization of isoprene was assumed to be complete. The system was cooled to room temperature, admixed with 0.5 millimole of tris(dimethylamino)phosphine oxide, and further cooled to −78°C. Polymerization of α,p-dimethylstyrene was continued at −78°C. for 17 hours. After completion of the reaction, the reaction mixture was poured into a large volume of methanol to recover a block copolymer which weighed 28 g (100% yield) and had an intrinsic viscosity $[\eta]$ of 1.89 dl/g as measured in toluene at 25°C.

The physical properties of the block copolymer are as follows:

| | |
|---|---|
| Tensile strength, kg/cm² | 238 |
| Elongation, % | 1480 |
| 300 %-Modulus, kg/cm² | 20 |
| Hardness | 64 |

EXAMPLE 2

To 500 ml of toluene which has been dehydrated and purified in an ordinary way, were added 14.5 ml of α,p-dimethylstyrene, p-dimethylstyrene, 22.5 ml of isoprene, both of which had been dehydrated with calcium hydride. After addition of 0.25 millimole (0.5 millimole as active lithium) of 1,2-dilithio-1,2-diphenylethane to the mixture, polymerization was initiated at 50°C. The color of the reaction system turned from yellow to red in 4.5 hours after commencement of the polymerization. After 6 hours, the reaction system was cooled to 25°C., admixed with 0.5 millimole of tris(dimethylamino)-phosphine oxide, and polymerization of the α,p-dimethylstyrene was allowed to proceed at −78°C. for 17 hours. After completion of the reaction, the reaction mixture was poured into a large volume of methanol to recover a block copolymer, which weighed 28.9 g and had an intrinsic viscosity of 1.37 dl/g as measured in toluene at 25°C.

Physical properties of the block copolymer are as follows:

| | |
|---|---|
| Tensile strength, kg/cm² | 350 |
| Elongation, % | 1075 |
| 300 %-Modulus, kg/cm² | 85 |
| Hardness | 92 |

EXAMPLE 3

To 500 ml of n-heptane dehydrated and dried in customary way, were added under a nitrogen atmosphere 6.1 g of α-methylstyrene dehydrated with calcium hydride, and 20 g of butadiene which had been treated with a n-hexane solution containing n-butyllithium. After addition of 0.25 millimole (0.5 millimole as active lithium) of 1,4-dilithio-1,1,4,4-tetraphenyl-butane as catalyst under a nitrogen atmosphere to the said mixture, polymerization was initiated at 50°C. In 6 hours after the commencement of polymerization the color of the reaction system turned from yellow to red, when the system was cooled to room temperature. After addition of 0.5 millimole of tris(dimethylamino)phosphine oxide, polymerization of α-methylstyrene was allowed to proceed at −78°C. for 17 hours. After completion of the reaction, the reaction mixture was poured into a large volume of methanol to recover a block copolymer, which weighed 25.7 g and had an intrinsic viscosity $[\eta]$ of 1.80 dl/g as measured in toluene at 25°C.

Physical properties of the block copolymer are as follows:

| | |
|---|---|
| Tensile strength, kg/cm² | 240 |
| Elongation, % | 1500 |
| 300 %-Modulus, kg/cm² | 32 |
| Hardness | 75 |

EXAMPLE 4

To 500 ml of n-heptane dehydrated and dried in customary way, were added under a nitrogen atmosphere 10 g of styrene, 15 g of isoprene, both of which had been dehydrated with calcium hydride, and 0.25 millimole (0.5 millimole as active lithium) of oligoisoprenyl-dilithium as catalyst. Polymerization was initiated at 50°C. The viscosity of the reaction system increased with the lapse of time and the color of the system turned from yellow to red in 3 hours, when the polymerization of isoprene was assumed to be complete. The system was cooled to 0°C., admixed with 0.5 millimole of N,N',N,N'-tetramethyl-1,2-ethanediamine to further continue polymerization of styrene. In the absence of a complexing agent, polymerization of styrene in n-heptane at 0°C, required 24 to 48 hours before completion, whereas in the present Example polymerization was completed in only 10 minutes. After completion of the reaction, the reaction mixture was poured into a large volume of methanol to recover a block copolymer, which weighed 24.8 g (99% yield) and had an intrinsic viscosity of 1.35 dl/g as measured in toluene at 25°C.

Physical properties of the block copolymer are as follows:

| | |
|---|---|
| Tensile strength, kg/cm² | 129 |
| Elongation, % | 1030 |
| 300 %-Modulus, kg/cm² | 21 |
| Hardness | 68 |

We claim:

1. A process for producing a block copolymer having a middle copolymer block composed predominantly of units of conjugated diene and remaining units of a vinyl-substituted aromatic hydrocarbon of the general formula

wherein Ar is an aryl group and R is hydrogen or an alkyl group of 1 to 10 carbon atoms and hompolymer end blocks composed of said vinyl-substituted aromatic hydrocarbon units, by the action of a dilithium compound on coexistent conjugated diene and vinyl-substituted aromatic hydrocarbon, comprising polymerizing said conjugated diene and said vinyl-substituted aromatic hydrocarbon at a temperature of —20° to 100°C in a solvent which is inert to the polymer formed by the action of said dilithium compound on coexistent conjugated diene and vinyl-substituted aromatic hydrocarbon, and after substantial completion of polymerization of said conjugated diene, adding to the polymerization system a chelating tri-functional Lewis base of the general formula

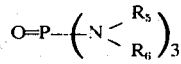

wherein $R_5$ and $R_6$ are alkyl groups of 1 to 4 carbon atoms in a ratio of at least 1:1 against the active end groups, and then polymerizing the remaining vinyl-substituted aromatic hydrocarbon at a temperature of —78°C up to the boiling point of the solvent used.

2. A process according to claim 1, wherein the chelating tri-functional Lewis base is tris(dimethylamino)-phosphine oxide or tris(diethylamino)phosphine oxide.

3. A process according to claim 1, wherein the chelating tri-functional Lewis base is tris(dimethylamino)-phosphine oxide.

4. A process according to claim 1, wherein the vinyl-substituted aromatic hydrocarbon is styrene, 3-vinyltoluene, α-methylstyrene, α,p-dimethylstyrene, 2,5-dimethyl-α-methylstyrene or 1-vinylnaphthalene.

5. A process according to claim 1, wherein the vinyl-substituted aromatic hydrocarbon is α-methylstyrene.

6. A process according to claim 1, wherein the conjugated diene is 1,3-butadiene, isoprene or 1,3-pentadiene.

7. A process according to claim 1, wherein the dilithium compound is a member selected from the group consisting of methylenedilithium, ethylenedilithium, trimethylenedilithium, tetramethylenedilithium, pentamethylenedilithium, hexamethylenedilithium, 1,4-dilithiobenzene, 1,5-dilithionaphthalene, 1,2-dilithio-1,2-diphenylethane, 1,2-dilithio-1,3diphenylpropane, 1,4-dilithio-1,1,4,4-tetraphenylbutane; addition compounds of metallic lithium with isoprene, styrene and α-methylstyrene; and addition compounds of metallic lithium with naphthalene, anthracene and phenanthrene.

8. A process according to claim 1, wherein the ratio of the vinyl-substituted aromatic hydrocarbon component in the block copolymer is 5 to 50% by weight.

9. A process according to claim 1, wherein the polymerization is carried out in the solution phase using a solvent.

10. A process according to claim 9, wherein the solvent is at least one member selected from the group consisting of benzene, toluene, n-hexane, n-heptane and cyclohexane.

11. A process according to claim 1, wherein polymerization is carried out in bulk.

* * * * *